(12) United States Patent
Oh

(10) Patent No.: US 9,898,648 B2
(45) Date of Patent: Feb. 20, 2018

(54) FACE RECOGNITION METHOD

(71) Applicant: ELECTRONICS AND TELECOMMUNICATIONS RESEARCH INSTITUTE, Daejeon (KR)

(72) Inventor: Sang Yoon Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 130 days.

(21) Appl. No.: 15/045,023

(22) Filed: Feb. 16, 2016

(65) Prior Publication Data

US 2017/0236002 A1 Aug. 17, 2017

(30) Foreign Application Priority Data

Feb. 15, 2016 (KR) .................. 10-2016-0017307

(51) Int. Cl.
G06K 9/00 (2006.01)
G06K 9/62 (2006.01)

(52) U.S. Cl.
CPC ..... *G06K 9/00288* (2013.01); *G06K 9/00281* (2013.01); *G06K 9/6215* (2013.01)

(58) Field of Classification Search
CPC ............. G06K 9/00288; G06K 9/6215; G06K 9/00281
See application file for complete search history.

(56) References Cited

U.S. PATENT DOCUMENTS

| 5,850,470 A * | 12/1998 | Kung ................. G06K 9/00241 382/116 |
| 7,107,536 B1 * | 9/2006 | Dowling ............. G06F 17/2247 707/999.003 |
| 7,386,554 B2 * | 6/2008 | Ripley .............. G06F 17/30477 |
| 7,426,287 B2 | 9/2008 | Yoon et al. |
| 7,492,943 B2 * | 2/2009 | Li ....................... G06K 9/00288 382/115 |
| 7,809,722 B2 * | 10/2010 | Gokturk ............ G06F 17/30256 382/305 |

(Continued)

FOREIGN PATENT DOCUMENTS

KR 10-2006-0033645 A 4/2006
KR 10-0844128 B1 7/2008

(Continued)

*Primary Examiner* — Samir Ahmed

(57) ABSTRACT

A face recognition method of the present disclosure includes configuring aggregations of feature data that include a plurality of feature data of faces and match to a plurality of personnel data; extracting from an input image a plurality of input feature data that correspond to the feature data and that is equal to or more than a critical value; comparing an aggregation of input feature data that includes the input feature data with each of the pre-stored aggregations of feature data, and selecting from the aggregations of feature data an aggregation of feature data having the greatest similarity with the aggregation of the input feature data; and identifying a person on the image based on personnel data that matches the aggregation of feature data having the greatest similarity.

20 Claims, 7 Drawing Sheets

(56) References Cited

U.S. PATENT DOCUMENTS

| | | | |
|---|---|---|---|
| 7,962,500 B2 * | 6/2011 | van Zwol | G06F 17/30265 |
| | | | 707/706 |
| 8,559,684 B1 * | 10/2013 | Nechyba | G06K 9/00926 |
| | | | 382/118 |
| 2004/0264780 A1 * | 12/2004 | Zhang | G06F 17/30265 |
| | | | 382/224 |
| 2009/0196510 A1 * | 8/2009 | Gokturk | G06F 17/30253 |
| | | | 382/224 |
| 2011/0135165 A1 * | 6/2011 | Wechsler | G06K 9/6228 |
| | | | 382/118 |
| 2013/0121584 A1 * | 5/2013 | Bourdev | G06K 9/00281 |
| | | | 382/190 |
| 2014/0044348 A1 * | 2/2014 | Chen | G06K 9/00221 |
| | | | 382/159 |

FOREIGN PATENT DOCUMENTS

| | | |
|---|---|---|
| KR | 10-2014-0053504 A | 5/2014 |
| KR | 10-2014-0069529 A | 6/2014 |

* cited by examiner r_eye_face = d2/d1 r_nose_face = d4/d3 r_eye_nose = d6/d5 r_mouth_face = d8/d7 r_eye_mouth = d7/d1 r_nose_mouth = d7/d3

FIG. 4A

FEATURE DATA DB

| ID | r_eye_face | r_nose_face | r_eye_nose | r_mouth_face | r_eye_mouth | r_nose_mouth | NAME |
|----|------------|-------------|------------|--------------|-------------|--------------|------|
| 1  | 5.5        | 3.5         | 1.9        | 2.5          | 1.9         | 1.3          | HONG GIL DONG |
| 2  | 4.9        | 3.2         | 1.4        | 2.1          | 2           | 1.4          | KIM YOUNG HEE |
| 3  | 5.9        | 3.5         | 1.6        | 2.5          | 1.9         | 1.2          | HONG GIL DONG |
| 4  | 4.7        | 3.5         | 1.3        | 2.4          | 1.6         | 1.3          | KIM YOUNG HEE |

FIG. 4B

MAXIMUM VALUE AND MINIMUM VALUE OF FEATURE DATA

|     | r_eye_face | r_nose_face | r_eye_nose | r_mouth_face | r_eye_mouth | r_nose_mouth |
|-----|------------|-------------|------------|--------------|-------------|--------------|
| max | 5.9        | 3.5         | 1.9        | 2.5          | 2           | 1.4          |
| min | 4.7        | 3.2         | 1.3        | 2.1          | 1.6         | 1.2          |

FIG. 5A

INPUT FEATURE DATA EXTRACTED FROM FIRST IMAGE

| INPUT FEATURE DATA | r_eye_face | r_nose_face | r_eye_nose | r_mouth_face | r_eye_mouth | r_nose_mouth |
|---|---|---|---|---|---|---|
| | 5 | 4 | 1.1 | 2.3 | 1.8 | 1.5 |

FIG. 5B

INPUT FEATURE DATA EXTRACTED FROM SECOND IMAGE

| INPUT FEATURE DATA | r_eye_face | r_nose_face | r_eye_nose | r_mouth_face | r_eye_mouth | r_nose_mouth |
|---|---|---|---|---|---|---|
| | 0 | 3.8 | 0 | 2.4 | 1.7 | 1.3 |

FACE RECOGNITION METHOD

TECHNICAL FIELD

Various embodiments of the inventive concept of the present disclosure relate to a face recognition method, and more particularly, to a face recognition method for extracting feature data from an image to identify a person appearing on the image.

BACKGROUND OF THE INVENTION

A general face recognition method extracts feature data of a face and compares the extracted feature data with pre-stored data to determine similarity between the extracted feature data and the pre-stored data. The similarity between the extracted feature data of the face and the pre-stored data may be determined using geometrical features of certain parts of the face such as for example the position of an eye, and the position of a mouth, or by using features such the size of an eye, the size of a mouth, and the histogram of an eye etc.

However, there may be cases where it is not possible to identify the feature data of a face or the feature data being provided is less than a critical value. For example, in the case of using feature data of an eye, if a portion or an entirety of the eye is blocked by hair or glasses etc., it would be either not possible to obtain any feature data of the eye, or the feature data being provided may be less than the critical value, making it difficult to determine the similarity between the feature data and the pre-stored data. Likewise, in the case of using feature data of a mouth, if a portion or an entirety of the mouth is blocked by a hand or clothes etc., it would be either not possible to obtain any feature data of the mouth, or the feature data being provided may be less than a critical value, making it difficult to determine the similarity between the feature data and the pre-stored data.

Consequently, in the case where some of the feature data is not identifiable from the image or the feature data being provided is less than the critical value, a recognition error may occur or it may be difficult to recognize the face even when the feature data of a same person exists in the database.

DISCLOSURE OF THE INVENTION

Technical Problem

A purpose of the present disclosure is to provide a face recognition method capable of recognizing a face of a person even when feature data of a certain portion of the face is not identifiable precisely.

Technical Solution

According to an embodiment of the present disclosure, a face recognition method includes configuring aggregations of feature data that include a plurality of feature data of faces and match to a plurality of personnel data; extracting from an input image a plurality of input feature data that correspond to the feature data and that is equal to or more than a critical value; comparing an aggregation of input feature data that includes the input feature data with each of the pre-stored aggregations of feature data, and selecting from the aggregations of feature data an aggregation of feature data having the greatest similarity with the aggregation of the input feature data; and identifying a person on the image based on personnel data that matches the aggregation of feature data having the greatest similarity.

In an embodiment, the extracting the plurality of input feature data may involve setting a value of the feature data that is unrecognizable from the input image or that is less than the critical value to zero (0). In an embodiment, the selecting an aggregation of feature data having the greatest similarity may include computing values of comparison between the input feature data and the feature data for each of the aggregations of feature data; computing a sum of the computed values of comparison; and selecting an aggregation with the smallest sum of values of comparison as the aggregation of feature data having the greatest similarity.

In an embodiment, the computing the values of comparison may involve setting the values of comparison between the feature data that is unrecognizable and the feature data corresponding to the unrecognizable feature data to zero (0). In an embodiment, the method may further include determining whether or not the sum of the values of comparison is below a reference value. In an embodiment, the method may further include, when the sum of the values of comparison of the aggregation of feature data having the greatest similarity is below the reference value, further storing the input feature data and the personnel data matching the input feature data in a feature data DB.

In an embodiment, the identifying a person on the image may involve, when the sum of the values of comparison of the aggregation of feature data having the greatest similarity is equal to or above the reference value, determining that there is no personnel data corresponding to the person on the image. In an embodiment, the plurality of aggregations of feature data of a same person may be pre-stored in the feature data DB.

In an embodiment, the feature data may be a distance between feature points or a ratio of widths of certain areas. In an embodiment, the distance between feature points or the widths of certain areas may be calculated in pixel units. In an embodiment, the extracting input feature data may involve recognizing a face outline or a feature area of the face from the image.

In an embodiment, the feature data may include first feature data that is a ratio of a width of a right eye and a first face width; second feature data that is a ratio of a width of a nose and a second face width; third feature data that is a ratio of a width of a left eye and the width of the nose; fourth feature that is a ratio of a width of a mouth and a third face width; fifth feature that is a ratio of the width of the right eye and the width of the mouth; and sixth feature data that is a ratio of the width of the nose and the width of the mouth.

In an embodiment, the width of the right eye may be defined as a maximum width of a right eye area in a width direction. In an embodiment, the width of the left eye may be defined as a maximum width of a left eye area in a width direction. In an embodiment, the first face width may be defined as a distance between the points at which a horizontal line from a central point of the right eye area and a central point of the left eye area intersects with the face outline.

In an embodiment, the width of the nose may be defined as a maximum width of a nose area in a width direction. In an embodiment, the second face width may be defined as a distance between the points in which a horizontal line extended from the maximum width of the nose area at the width direction intersects with the face outline.

In an embodiment, the width of the mouth may be defined as a maximum width of a mouth area in a width direction. In an embodiment, the third face width may be defined as a distance between the points at which a horizontal line extended from the maximum width of the mouth area in the width direction intersects with the face outline.

Effects of the Invention

According to the present disclosure, by extracting from an input image a plurality of input feature data that is more than a critical value, and then comparing the extracted input feature data with aggregations of feature data pre-stored so as to determine similarity between them, it is possible to identify a person on the image even when some of the feature data of the face of the person is not identifiable precisely.

BRIEF DESCRIPTION OF THE DRAWINGS

FIG. 4A is a table of aggregations of feature data stored in a feature data DB according to an embodiment of the present disclosure, and FIG. 4B is a table of maximum values and minimum values of the feature data exemplified in FIG. 4A; and FIG. 5A is a table of aggregations of input feature data according to an embodiment of the present disclosure, and FIG. 5B is a table of aggregations of input feature data according to another embodiment of the present disclosure.

DETAILED DESCRIPTION OF THE INVENTION

Figure 1:
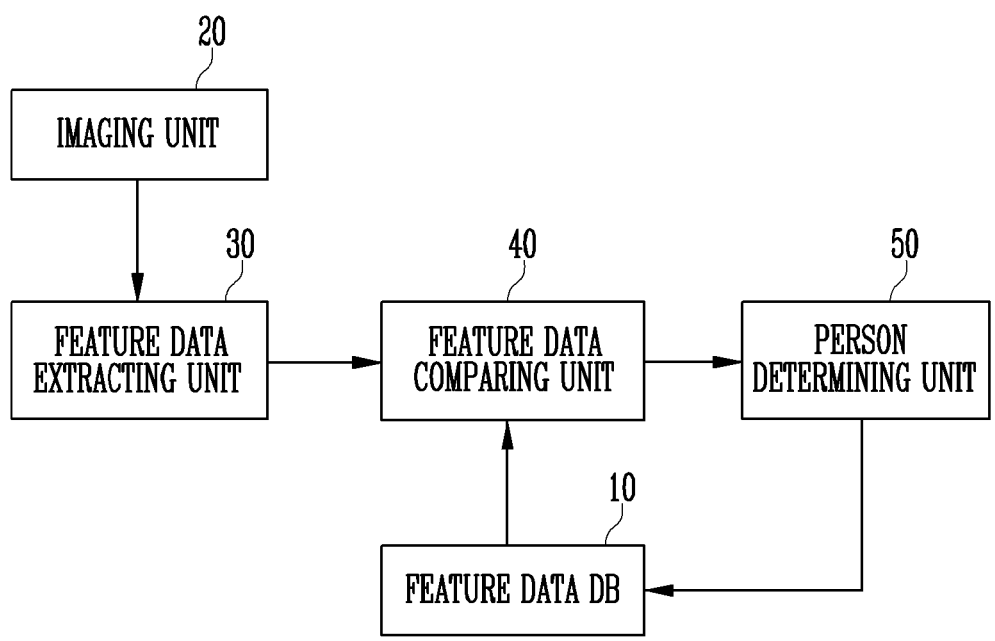
FIG. 1 is a diagram schematically illustrating the configuration of a face recognition system according to an embodiment of the present disclosure.

Specific structural or functional descriptions of exemplary embodiments in accordance with a concept of the present invention which are disclosed in this specification are illustrated only to describe the exemplary embodiments in accordance with the concept of the present invention and the exemplary embodiments in accordance with the concept of the present invention may be carried out by various forms but the present invention is not limited to the exemplary embodiments described in this specification.

Various modifications and changes may be applied to the exemplary embodiments in accordance with the concept of the present invention so that the exemplary embodiments will be illustrated in the drawings and described in detail in the specification. However, the exemplary embodiments according to the concept of the present invention is not limited to the specific embodiments, but includes all changes, equivalents, or alternatives which are included in the spirit and technical scope of the present invention.

Terminologies such as first or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions which describe the relationship between components, that is, "between" and "directly between", or "adjacent to" and "directly adjacent to" need to be interpreted by the same manner.

Terminologies used in the present specification are used only to describe specific exemplary embodiments, and are not intended to limit the present invention. A singular form may include a plural form if there is no clearly opposite meaning in the context. In the present specification, it should be understood that terms "include" or "have" indicate that a feature, a number, a step, an operation, a component, a part or the combination those of described in the specification is present, but do not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if they are not clearly defined in this specification.

FIG. 1 is a diagram schematically illustrating the configuration of a face recognition system according to an embodiment of the present disclosure.

Referring to FIG. 1, the face recognition system according to an embodiment of the present disclosure may include a feature data DB 10, an imaging unit 20, a feature data extracting unit 30, a feature data comparing unit 40, and a person determining unit 50. Each of these components may be configured to operate as one or more hardware or software modules for performing the operations of the present disclosure. The feature data extracting unit 30, the feature data comparing unit 40, and the person determining unit 50 may be included in an integrated computer system. The face recognition system may further include a display unit (not illustrated) for outputting results of face recognition.

In the feature data DB 10, aggregations of feature data matching a plurality of personnel data are stored. Each aggregation of feature data includes a plurality of feature data of a face. The personnel data and the aggregation of feature data correspond to each other one by one, but a plurality of aggregation of feature data may match to a same person. The feature data may be a distance between feature points of the face identified from the image, or a ratio value of widths of feature areas. Explanation on the feature data and the aggregation of the feature data will be made more specifically later on.

The imaging unit 20 may include a charged-coupled device (CCD), and may be configured to take an optical image (or video). A plurality of imaging units 20 may be installed in a plurality of areas and transmit images through a wired/wireless communication network such as the internet. For example, the imaging unit 20 may be installed in places such as crime-ridden areas, school zones, financial institutions, public offices, apartment entrances and the like where face recognition and security surveillance is required. In addition, the imaging unit 20 may have a variable direction in image taking, and a function for expanding or reducing a subject of image taking.

The feature data extracting unit 30 extracts input feature data from the image provided by the imaging unit 20. The input feature data includes an aggregation of input feature data corresponding to one image. More specifically, the input feature data corresponds to feature data stored in the feature data DB 10. For example, if the predetermined number of types of the feature data is six (6), the feature data extracting unit 30 will extract six (6) types of input feature data from the image. For this purpose, the feature data extracting unit 30 may recognize a face outline or a feature area of the face from the image.

Furthermore, the feature data extracting unit 30 determines whether or not the recognized data is normal data by checking whether or not the recognized data is equal to or more than a critical value. For example, the feature data extracting unit 30 may set the value of unrecognizable feature data that cannot be identified from the image or that is less than the critical value to zero (0).

The feature data comparing unit 40 compares the aggregation of input feature data provided from the feature data extracting unit 30 with each of the aggregations of feature data pre-stored in the feature data DB 10, and selects from the aggregations of feature data pre-stored in the feature data DB 10 an aggregation of feature data that has the greatest similarity with the aggregation of input feature data.

More specifically, the feature data comparing unit 40 computes values of comparison between the input feature data and the feature data in the feature data DB 10. Furthermore, the feature data comparing unit 40 computes a sum of the comparison values for each of the aggregations of feature data. Herein, a value of comparison between unrecognizable feature data and the feature data may be set to zero (0). That is, the feature data comparing unit 40 sets the values of the items of unrecognizable feature data to zero (0), thereby determining the similarity with only the normal input feature data. Then, the feature data comparing unit 40 selects the aggregation of feature data having the smallest sum of comparison values as the aggregation of feature data having the greatest similarity. That is, the feature data comparing unit 40 may determine that the smaller the sum of comparison values, the greater the similarity.

The person determining unit 50 identifies the person on the image based on the personnel data that matches the aggregation of feature data that the feature data comparing unit 40 determined as having the greatest similarity. For example, the personnel data may include a name, where the person belongs to, address, contact number, qualifications, and rights and authorities etc., and the personnel determining unit 50 may discern whether the person is an authorized person or a dangerous person based on the personnel data.

The person determining unit 50 may determine whether or not the sum of the comparison values regarding the aggregation of feature data having the greatest similarity is below a reference value. When the sum of the comparison values is equal to or above the reference value, the person determining unit 50 may determine that there is no personnel data corresponding to the person on the image. That is because, even if an aggregation of feature data pre-stored having the greatest similarity has been determined, if that similarity is below a certain level, it cannot be determined that the person on the image is the same person as the person in the pre-stored personnel data. Therefore, the process of determining whether the similarity with the pre-stored data is equal to or above a certain level increases the accuracy of face recognition.

The face recognition system of the present disclosure is not limited to the above configuration. That is, each process of the face recognition system of the present disclosure may be performed through other types of computer apparatuses provided with a related program and capable of creating, storing and processing information.

Figure 2:
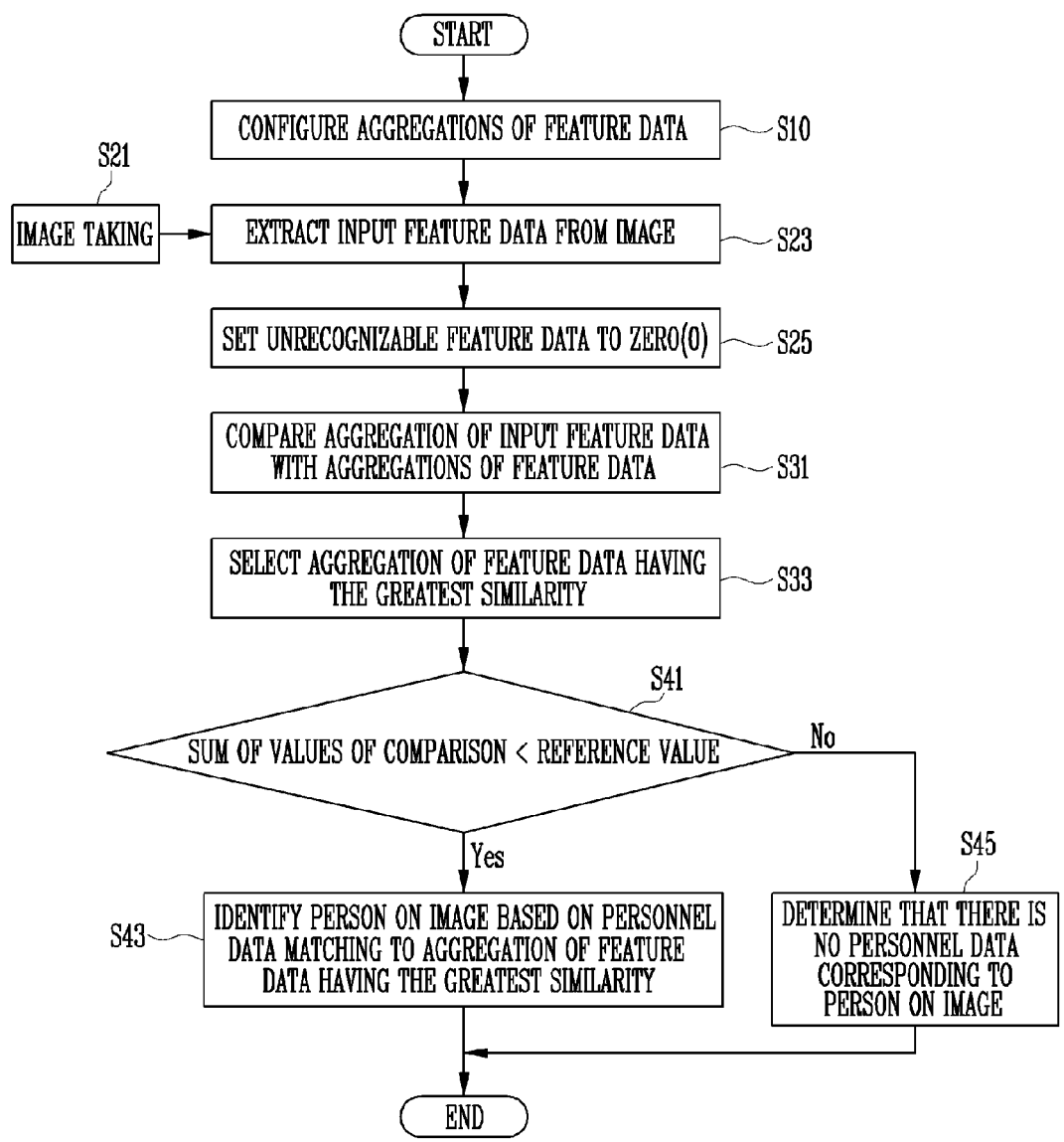
FIG. 2 is a flowchart of a face recognition method according to an embodiment of the present disclosure.

FIG. 2 is a flowchart of a face recognition method according to an embodiment of the present disclosure.

Referring to FIG. 2, first of all, aggregations of feature data matching a plurality of personnel data are configured and pre-stored in the feature data DB 10 (S10). Herein, each aggregation of feature data includes a plurality of feature data of a face. The feature data may be a distance between feature points of the face identified from an image, or a ratio of widths of feature areas. Furthermore, in the case of a same person based on the personnel data, when a difference of feature data exceeds a reference value due to facial expressions etc., the feature data and the personnel data are stored in the feature data DB 10, but when a difference of the feature data is below the reference value, the feature data and the personnel data are not stored in the feature data DB 10.

The imaging unit 20 provides an image obtained (S21). A plurality of imaging units 20 may be installed in a plurality of areas and transmit images through a wired/wireless communication network such as the internet.

Then, the feature data extracting unit 30 extracts from the input image a plurality of input feature data that is equal to or more than a critical value (S23). For this purpose, the feature data extracting unit 30 may recognize a face outline or a feature area of the face from the image. The input feature data is compared to the feature data pre-stored in the feature data DB 10. The input feature data consists of one aggregation input feature data corresponding to one image.

The feature data extracting unit 30 sets the value of unrecognizable feature data that cannot be identified from the image or that is less than the critical value to zero (0) (S25). That is, the feature data extracting unit 30 determines whether or not the recognized data is normal data. Furthermore, the feature data extracting unit 30 may set the value of the unrecognizable feature data to zero (0) so that it is excluded from a subsequent face recognition process.

Then, the feature data comparing unit 40 compares the aggregation of input feature data with each of the aggregations of feature data pre-stored in the feature data DB 10 (S31). Then, the feature data comparing unit 40 selects from the aggregations of feature data an aggregation having the greatest similarity with the aggregation of input feature data (S33).

More specifically, the feature comparing unit 40 computes values of comparison between the input feature data and the feature data. Furthermore, the feature comparing unit 40 computes a sum of the comparison values regarding each of the aggregations of feature data. Herein, the value of comparison between unrecognizable feature data and the feature data may be set to zero (0). That is, the feature data comparing unit 40 sets the values of the items regarding unrecognizable feature data to zero (0) so that only zero (0) is added to the sum of values of comparison, thereby determining similarity with only normal input feature data. Then, the feature data comparing unit 40 selects the aggregation of feature data having the smallest sum of comparison values as the aggregation of feature data having the greatest similarity. That is, the feature data comparing unit 40 may determine that the smaller the sum of comparison values, the greater the similarity.

Then, the person determining unit 50 determines whether or not the sum of comparison values is below a reference value (S41). If the sum of the comparison values is below the reference value, the person determining unit 50 identifies the person on the image based on the personnel data matching the aggregation of feature data having the greatest similarity (S43). But if the sum of the comparison values is equal to or above the reference value, the person determining unit 50 determines that there is no personnel data corresponding to the person on the image (S45). That is, in consideration of the possibility that personnel data of the person on the image may not have been actually registered in the feature data DB 10, the person determining unit 50 identifies the person on the image and the pre-stored personnel data as the same person only when the similarity is above a certain level.

FIGS. 3A, 3B, 3C, 3D, 3E, and 3F are diagrams illustrating feature data according to an embodiment of the present disclosure.

Hereinafter, explanation will be made based on an assumption that there are six (6) types of feature data according to the embodiment of the present disclosure. Each feature data may be a distance between feature points of the face identified from an image, or a ratio between widths of feature areas. The distance between feature points of the face or the width of the feature area of the face may be calculated in pixel units. Since the feature data is determined using ratios in pixel units, the geometric feature of a face will be determined regardless of the size of the image.

Figure 3A:
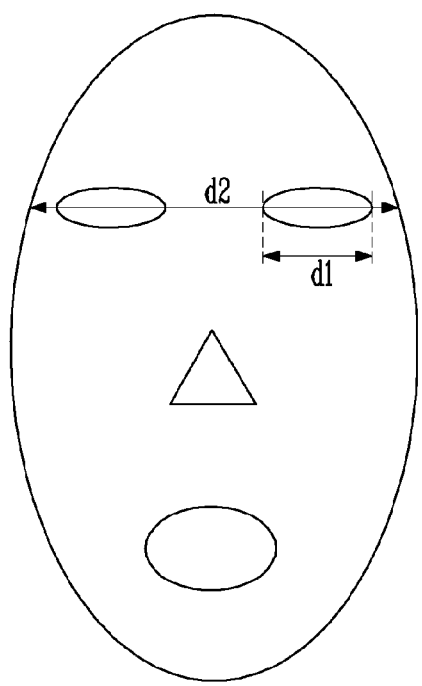
FIGS. 3A, 3B, 3C, 3D, 3E, and 3F are diagrams illustrating feature data according to an embodiment of the present disclosure.

Referring to FIG. 3A, first feature data r_eye_face is a ratio of a width of a right eye d1 and a first face width d2. The width of the right eye d1 may be defined as a maximum width of a right eye area in a width direction. Herein, the right side refers to the right side when seen from the opposite side of the face image. The first face width d2 may be defined as the distance between the points at which a horizontal line from a central point of the right eye area and a central point of the left eye area intersects with the face outline. However, ear areas at both sides of the face are excluded from the first face width d2. For example, when the width of the right eye d1 is 50 pixels and the first face width d2 is 271 pixels, the first feature data r_eye_face is 271/50, and thus 5.42.

Figure 3B:
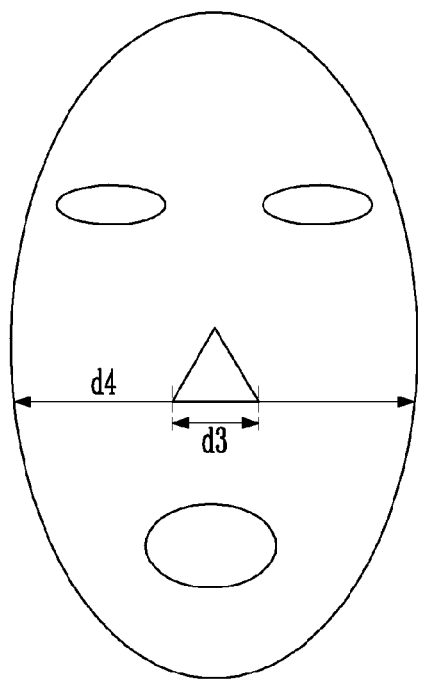

Referring to FIG. 3B, second feature data r_nose_face is a ratio of a width of a nose d3 and a second face width d4. The width of the nose d3 may be defined as a maximum width of a nose area in a width direction. The second face width d4 may be defined as the distance between the points at which a horizontal line extended from the maximum width of the nose area in the width direction intersects with the face outline.

Figure 3C:
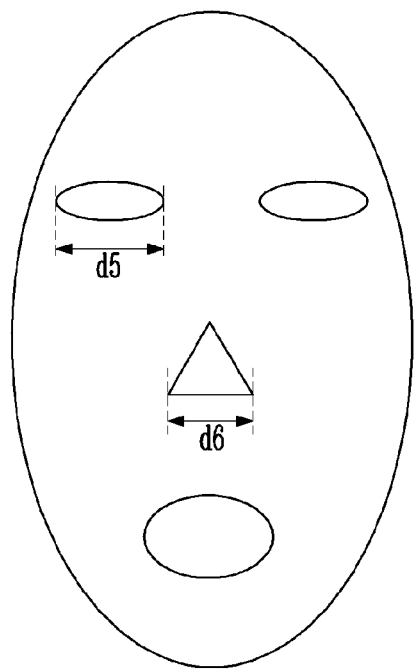

Referring to FIG. 3C, third feature data r_eye_nose is a ratio of a width of a left eye d5 and a width of a nose d6. The width of the left eye d5 may be defined as a maximum width of a left eye area in a width direction. The width of the nose d6 may be defined as a maximum width of a nose area in a width direction.

Figure 3D:
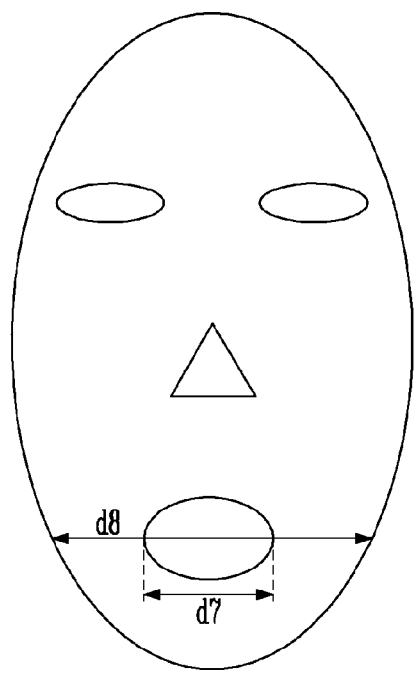

Referring to FIG. 3D, fourth feature data r_mouth_face is a ratio of a width of a mouth d7 and a third face width d8. The width of the mouth d7 may be defined a maximum width of a mouth area in a width direction. The third face width d8 may be defined as a distance between the points at which a horizontal line extended from the maximum width of the mouth area in the width direction intersects with the face outline.

Figure 3E:
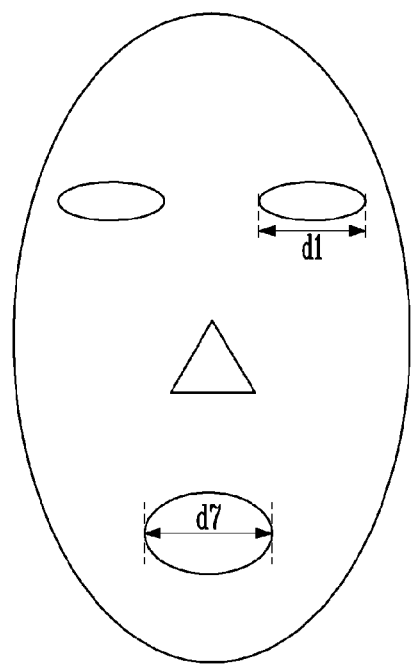

Referring to FIG. 3E, fifth feature data r_eye_mouth is a ratio of the width of the right eye d1 and the width of the mouth d7. The width of the right eye d1 may be defined as the maximum width of the right eye area in the width direction.

Figure 3F:
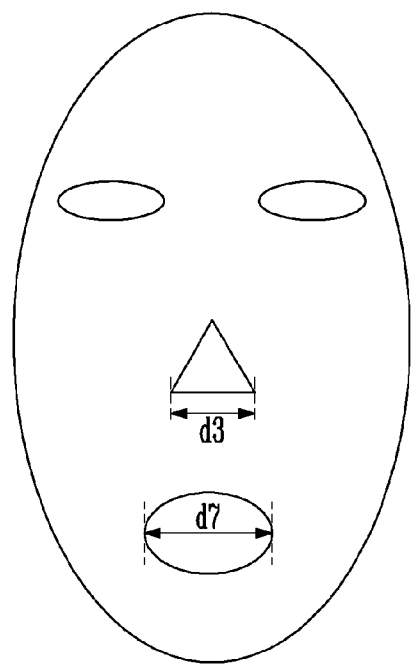

Referring to FIG. 3F, sixth feature data r_nose_mouth is a ratio of the width of the nose d3 and the width of the mouth d7. The width of the nose d3 may be defined as the maximum width of the nose area in the width direction. The width of the mouth d7 may be defined as the maximum width of the mouth area in the width direction.

FIG. 4A is a table of aggregations of feature data according to an embodiment of the present disclosure, FIG. 4B is a table of maximum values and minimum values of the feature data exemplified in FIG. 4A, FIG. 5A is a table of aggregations of input feature data according to an embodiment of the present disclosure, and FIG. 5B is a table of aggregations of input feature data according to another embodiment of the present disclosure.

Hereinafter, a face recognition process will be explained in detail through two embodiments where input feature data is extracted from an image with feature data stored in the feature data DB 10 as certain values.

Referring to FIGS. 4A and 4B, an assumption will be made that according to an embodiment of the present disclosure, each of the aggregations of feature data consists of first to sixth feature data. The aggregations of feature data are classified by IDs, and they match to a plurality of personnel data, but it is possible that two or more aggregations of feature data match to a same person.

For example, a first aggregation of feature data ID1 is feature data of Hong Gil Dong. A second aggregation of feature data ID2 is feature data of Kim Young Hee. A third aggregation of feature data ID3 is feature data of Hong Gil Dong. A fourth aggregation of feature data ID4 is a feature data of Kim Young Hee. Herein, the first aggregation of feature data ID1 and the third aggregation of feature data ID3 both consist of feature data of Hong Gil Dong, but with different values. The second aggregation of feature data ID2 and the fourth aggregation of feature data ID4 both consist of feature data Kim Young Hee, but with different values. That is because feature data may have slightly different values due to different angles in which the images were taken or different facial expressions of the image.

Referring to FIG. 5A, an assumption will be made that according to an embodiment of the present disclosure input feature data is normal feature data without any unrecognizable feature data. The feature data extracting unit 30 extracts input feature data from a first image. The input feature data is matched to the six (6) types of feature data pre-stored in the feature data DB 10. The feature data comparing unit 40 compares the aggregation of input feature data provided from the feature data extracting unit 30 with each of the aggregations of feature data pre-stored in the feature data DB 10, and selects from the aggregations of feature data an aggregation of feature data that has the greatest similarity with the aggregation of input feature data.

More specifically, the feature data comparing unit 40 computes values of comparison between the input feature data and the feature data. Since the comparison values each correspond to one of the six (6) types of feature data, six (6) comparison values will be computed. In an embodiment, when comparing the aggregation of input feature data with an $i^{th}$ aggregation of feature data pre-stored in the feature data DB 10, the comparison value $s\_j$ of a $i^{th}$ feature data $r\_j$ may be computed using math equation 1 below.

$$s\_j = |(\text{input feature data } r\_j - i^{th} \text{ aggregation of feature data } r\_j)|/(j^{th} \text{ feature data } r\_j \text{ maximum value} - j^{th} \text{ feature data } r\_j \text{ minimum value})$$ [Math equation 1]

In the present embodiment, the $i^{th}$ aggregation of feature data is one of the first to fourth aggregations of feature data ID1, ID2, ID3, ID4, and the $j^{th}$ feature data r_j is one of the first to sixth feature data r_eye_face, r_nose_face, r_eye_nose, r_mouth_face, r_eye_mouth, r_nose_mouth.

For example, in the case of comparing the input feature data with the first aggregation of feature data pre-stored in the feature data DB 10, the comparison value s_eye_face of the first feature data r_eye_face is as follows.

$$s\_eye\_face=|(\text{input feature data } r\_eye\_face - \text{first aggregation of feature data } r\_eye\_face)|/(\text{first feature date } r\_eye\_face \text{ maximum value} - \text{first feature data } r\_eye\_face \text{ minimum value})$$

Referring back to FIGS. 4A, 4B, and 5A, and math equation 1, the process for computing comparison values s_j by comparing the aggregation of input feature data of the first image with the first aggregation of feature data ID1 is as follows.

The comparison value s_eye_face of the first feature data r_eye_face is as follows.

$$s\_eye\_face=|(5-5.5)|/(5.9-4.7)=0.4166$$

The comparison value s nose face of the second feature data r_nose_face is as follows.

$$s\_nose\_face=|(4-3.5)|/(3.5-3.2)=1.6666$$

The comparison value s_eye_nose of the third feature data r_eye_nose is as follows.

$$s\_eye\_nose=|(1.1-1.9)|/(1.9-1.3)=1.3333$$

The comparison value s_mouth_face of the fourth feature data r_mouth_face is as follows.

$$s\_mouth\_face=|(2.3-2.5)|/(2.5-2.1)=0.5$$

The comparison value s_eye_mouth of the fifth feature data r_eye_mouth is as follows.

$$s\_eye\_mouth=|(1.8-1.9)|/(2.0-1.6)=0.25$$

The comparison value s_nose_mouth of the sixth feature data r_nose_mouth is as follows.

$$s\_nose\_mouth=|(1.5-1.3)|/(1.4-1.2)=1$$

Then, a sum of the comparison values are computed. The sum s1 of the comparison values of the first aggregation of feature data ID1 is as follows.

$$s1=s\_eye\_face+s\_nose\_face+s\_eye\_nose+s\_mouth\_face+s\_eye\_mouth+s\_nose\_mouth=5.165$$

Furthermore, the sum s2 of the comparison values of the second aggregation of feature data ID2, the sum s3 of the comparison values of the third aggregation of feature data ID3, and the sum s4 of the comparison values of the fourth aggregation of feature data ID4 are computed as follows.

$$s2=4.75$$

$$s3=5.5$$

$$s4=4$$

Then, the aggregation of feature data having the smallest sum of the comparison values is selected as the aggregation of feature data having the greatest similarity. Since among the comparison values s1, s2, s3, s4 of the first to fourth aggregation of feature data, the comparison value s4 of the fourth aggregation feature data ID4 is the smallest, the fourth aggregation of feature data ID4 may be determined as the aggregation of feature data ID4 having the greatest similarity with the aggregation of input feature data. Furthermore, since the personnel data matching the fourth aggregation of feature data ID4 having the greatest similarity is Kim Young Hee, the person on the image may be identified as Kim Young Hee.

Hereinafter, referring to FIG. 5B, another embodiment of the present disclosure will be explained based on an assumption that there is unrecognizable feature data. The feature data extracting unit 30 extracts input feature data from a second image. Herein, an assumption will be made that in the second image, a left eye and a part of the left side of a face are blocked by hair. In such a case, a left eye area or an outline of the left side of the face may be unidentified or identified as being less than a critical value, and thus the first feature data r_eye_face and the third feature data r_eye_nose are set to zero (0).

The feature data comparing unit 40 computes values of comparison between the extracted input feature data and the feature data pre-stored in the feature data DB 10. The process of computing comparison values by comparing the aggregation of input feature data of the second image with the first aggregation of feature data ID1 in the same manner as in the aforementioned embodiment is as follows, except that the comparison values regarding the first feature data r_eye_face and the third feature data r_eye_nose are set to zero (0).

The comparison value s_eye_face of the first feature data r_eye_face is as follows.

$$s\_eye\_face=0$$

The comparison value s_nose_face of the second feature data r_nose_face is as follows.

$$s\_nose\_face=|(3.8-3.5)|/(3.5-3.2)=1$$

The comparison value s_eye-nose of the third feature data r_eye_nose is as follows.

$$s\_eye\_nose=0$$

The comparison value s_mouth_face of the fourth feature data r_mouth_face is as follows.

$$s\_mouth\_face=|(2.4-2.5)|/(2.5-2.1)=0.25$$

The comparison value s_eye_mouth of the fifth feature data r_eye_mouth is as follows.

$$s\_eye\_mouth=|(1.7-1.9)|/(2.0-1.6)=0.5$$

The comparison value s_nose_mouth of the sixth feature data r_nose_mouth is as follows.

$$s\_nose\_mouth=|(1.3-1.3)|/(1.4-1.2)=0$$

Then, a sum of the above comparison values is computed. The sum s1 of the comparison values of the first aggregation of feature data ID1 is as follows.

$$s1=s\_eye\_face+s\_nose\_face+s\_eye\_nose+s\_mouth\_face+s\_eye\_mouth+s\_nose\_mouth=1.75$$

Furthermore, sums s2, s3, s4 of the comparison values of the second to fourth aggregation of feature data computed in the same manner are as follows.

$$s2=4$$

$$s3=2.25$$

$$s4=1.25$$

A result of the comparison shows that the sum s4 of the comparison values of the fourth aggregation of feature data ID4 is the smallest among the sums s1, s2, s3, s4 of the comparison values of the first to fourth aggregation of feature data, and thus it may be determined that the fourth aggregation of feature data ID4 has the greatest similarity with the aggregation of the input feature data. Furthermore, since the personnel data matching the fourth aggregation of the feature data ID4 having the greatest similarity is Kim Young Hee, the person on the image may be identified as Kim Young Hee.

In the present embodiment, even though the left eye and the left side of the face of the person on the second image were blocked by hair, it was possible to determine the aggregation of feature data having the greatest similarity and identify the person on the image based on that result of determination.

According to the present disclosure, by extracting from an input image a plurality of input feature data that is more than a critical value, and then comparing the input feature data with aggregations of feature data pre-stored to determine similarity therebetween, it is possible to identify the person on the image even when some of the feature data of the face of the person is not precisely recognizable.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

| [Description of Reference Numerals] | |
|---|---|
| 10: A feature data DB | 20: An imaging unit |
| 30: A feature data extracting unit | |
| 40: A feature data comparing unit | |
| 50: A person determining unit | |
| d1: A width of a right eye | d2: A first face width |
| d3: A width of a nose | d4: A second face width |
| d5: A width of a left eye | d6: A width of a nose |
| d7: A width of a mouth | d8: A third face width |

The invention claimed is:

1. A face recognition method comprising:
storing a plurality of aggregations of sample feature data matched with corresponding personnel data, each of the plurality of aggregations of sample feature data including a ratio of a plurality of widths of feature areas of a sample face;
receiving, from an imager, an input image of a person;
extracting, from the input image, input feature data that are each equal to or more than a critical value;
comparing an aggregation of the input feature data with each of the plurality of stored aggregations;
selecting an aggregation among the plurality of stored aggregations having the greatest similarity with the aggregation of the input feature data; and
identifying the person based on the personnel data matched with the selected aggregation.

2. The method of claim 1,
wherein extracting the plurality of input feature data includes setting a value of the input feature data that corresponds to an unrecognizable feature or that is less than the critical value to zero (0).

3. The method of claim 2,
wherein selecting an aggregation of feature data having the greatest similarity comprises:
computing a plurality of values of comparison between the input feature data and the sample feature data for each of the plurality of stored aggregations;
computing a sum of the computed plurality of values of comparison for each of the plurality of stored aggregations; and
selecting an aggregation corresponding to the smallest sum of values of comparison as the aggregation having the greatest similarity.

4. The method of claim 3,
wherein computing the values of comparison includes setting each of the values of comparison corresponding to an unrecognizable feature, and the input feature data corresponding to the unrecognizable feature, to zero (0).

5. The method of claim 3, further comprising determining whether or not the sum of the values of comparison for each of the plurality of stored aggregations is below a reference value.

6. The method of claim 5,
wherein identifying the person includes, when the sum of the values of comparison of the selected aggregation is equal to or above the reference value, determining that there is no personnel data corresponding to the person on the image.

7. The method of claim 1,
wherein the plurality of aggregations of sample feature data are stored in a feature data database (DB), the face of each of the plurality of aggregations being of a pre-identified person.

8. The method of claim 1,
wherein the plurality of types of sample feature data includes a distance between feature points.

9. The method of claim 8,
wherein the distance between the feature points or each of the plurality of the widths of feature areas is calculated in pixel units.

10. The method of claim 8,
wherein extracting the input feature data involves recognizing a face outline or a feature area of a face from the input image.

11. The method of claim 10,
wherein the plurality of types of input feature data comprises:
first feature data that is a ratio of a width of a right eye and a first face width;
second feature data that is a ratio of a width of a nose and a second face width;
third feature data that is a ratio of a width of a left eye and the width of the nose;
fourth feature that is a ratio of a width of a mouth and a third face width;
fifth feature that is a ratio of the width of the right eye and the width of the mouth; and
sixth feature data that is a ratio of the width of the nose and the width of the mouth.

12. The method of claim 11,
wherein the width of the right eye is defined as a maximum width of a right eye area in a width direction.

13. The method of claim 11,
wherein the width of the left eye is defined as a maximum width of a left eye area in a width direction.

14. The method of claim 12,
wherein the first face width is defined as a distance between the points at which a horizontal line from a central point of the right eye area and a central point of the left eye area intersects with the face outline.

15. The method of claim 11, wherein the width of the nose is defined as a maximum width of a nose area in a width direction.

16. The method of claim 15, wherein the second face width is defined as a distance between the points at which a horizontal line extended from the maximum width of the nose area in the width direction intersects with the face outline.

17. The method of claim 11, wherein the width of the mouth is defined as a maximum width of a mouth area in a width direction.

18. The method of claim 17, wherein the third face width is defined as a distance between the points at which a horizontal line extended from the maximum width of the mouth area in the width direction intersects with the face outline.

19. A face recognition method comprising:
pre-storing aggregations of feature data that include a plurality of feature data of faces and match to a plurality of personnel data;
receiving, from an imager, an input image of a person;
extracting, from the input image, a plurality of input feature data that correspond to the feature data and that is equal to or more than a critical value;
comparing an aggregation of input feature data that includes the input feature data with each of the pre-stored aggregations of feature data, and selecting from the aggregations of feature data an aggregation of feature data having the greatest similarity with the aggregation of the input feature data; and
identifying the person based on personnel data that matches the aggregation of feature data having the greatest similarity,
wherein the feature data comprises:
first feature data that is a ratio of a width of a right eye and a first face width;
second feature data that is a ratio of a width of a nose and a second face width;
third feature data that is a ratio of a width of a left eye and the width of the nose;
fourth feature that is a ratio of a width of a mouth and a third face width;
fifth feature that is a ratio of the width of the right eye and the width of the mouth; and
sixth feature data that is a ratio of the width of the nose and the width of the mouth.

20. The method of claim 19, wherein the width of the right eye is defined as a maximum width of a right eye area in a width direction.

* * * * *